United States Patent
Yang et al.

(10) Patent No.: US 10,571,000 B2
(45) Date of Patent: Feb. 25, 2020

(54) ANTI-ROTATION DEVICE FOR DISTRIBUTOR INNER SHAFT STRUCTURE

(71) Applicant: GUANGZHOU TECH-LONG PACKAGING MACHINERY CO., LTD, Guangdong (CN)

(72) Inventors: Huiguang Yang, Guangdong (CN); Hengyi Fan, Guangdong (CN); Congmin Zhang, Guangdong (CN)

(73) Assignee: GUANGZHOU TECH-LONG PACKAGING MACHINERY CO., LTD, Guangzhou (CN)

( * ) Notice: Subject to any disclaimer, the term of this patent is extended or adjusted under 35 U.S.C. 154(b) by 825 days.

(21) Appl. No.: 14/782,749

(22) PCT Filed: Mar. 11, 2014

(86) PCT No.: PCT/CN2014/073200
§ 371 (c)(1),
(2) Date: Oct. 6, 2015

(87) PCT Pub. No.: WO2015/021774
PCT Pub. Date: Feb. 19, 2015

(65) Prior Publication Data
US 2016/0305516 A1    Oct. 20, 2016

(30) Foreign Application Priority Data

Aug. 16, 2013 (CN) .......................... 2013 1 0356393

(51) Int. Cl.
*B67C 3/22*       (2006.01)
*F16H 21/44*      (2006.01)

(52) U.S. Cl.
CPC ............. *F16H 21/44* (2013.01); *B67C 3/22* (2013.01); *B67C 3/225* (2013.01)

(58) Field of Classification Search
CPC ........... B67C 3/225; B67C 3/22; F16H 21/44; B65B 65/00; B65B 3/003; B65B 3/04
USPC ........................................................ 141/268
See application file for complete search history.

(56) References Cited

FOREIGN PATENT DOCUMENTS

| CN | 201437292 U | * | 4/2010 |
| CN | 201437292 U |   | 4/2010 |
| CN | 202687475 U | * | 1/2013 |
| CN | 202687475 U |   | 1/2013 |

(Continued)

*Primary Examiner* — William Kelleher
*Assistant Examiner* — Randell J Krug
(74) *Attorney, Agent, or Firm* — Lucas & Mercanti, LLP

(57) ABSTRACT

An anti-rotation device for a distributor inner shaft structure comprises an upright column, a bracket fastened on the upright column, two swing arms arranged in opposite directions, and two connecting rods arranged in parallel, wherein the upright column is fixed on the ground or fixedly connected to a non-rotating base frame on a filling machine, the middle parts of the two swing arms are respectively hinged on the bracket to swing horizontally, and the end parts of the two swing arms have meshing gear teeth. The two connecting rods are located between the swing arms and an inner shaft structure of the distributor, one end of each is respectively hinged to the other end of the corresponding swing arm, and the other ends of the two connecting rods are respectively hinged to the lower part of the inner shaft structure of the distributor, and capable of swinging horizontally.

4 Claims, 12 Drawing Sheets

(56) References Cited

FOREIGN PATENT DOCUMENTS

| CN | 202828124 U | * | 3/2013 | ............... B67C 3/22 |
| CN | 202828124 U | | 3/2013 | |
| CN | 203428115 U | | 2/2014 | |
| DE | 202005020980 U1 | | 2/2007 | |
| WO | 2010130099 A1 | | 11/2010 | |
| WO | WO-2010130099 A1 | * | 11/2010 | ............. H01H 9/281 |

* cited by examiner

ANTI-ROTATION DEVICE FOR DISTRIBUTOR INNER SHAFT STRUCTURE

CROSS-REFERENCE TO RELATED APPLICATIONS

This application is a 371 of PCT/CN2014/073200 filed Mar. 11, 2014, which in turn claims the priority of CN 201310356393.5 filed Aug. 16, 2013, the priority of both applications is hereby claimed and both applications are incorporated herein by reference.

BACKGROUND OF THE INVENTION

The present invention relates to an anti-rotation device for the inner shaft structure of a filling machine distributor.

Distributor is a transition mechanism in the rotary liquid filling machine, used for connecting through the piping of the filling machine to the external piping. For example, it can be used to connect the feeding tube of the accumulator to the outlet tube of the liquid material supply device, connect through the gas outlet tube of the filling valve to the external gas reflux tube, and connect through the CIP cleaning liquid inlet tube of the accumulator to the external CIP cleaning liquid supply tube, which generally comprises an inner shaft structure connected through to the external piping, and the outer ring rotatably mounted on the top of the inner shaft for connecting through to the piping of the filling machine. During operation, the outer ring will rotate together with the rotating stand of the filling machine, while the inner shaft structure should not rotate together with the rotating stand of the filling machine due to connecting through to the external piping, thus an anti-rotation device shall be provided on the filling machine to prevent rotation of the distributor.

FIGS. 1 and 12 show PRIOR ART. FIG. 2 shows applicant's invention.

The conventional anti-rotation device of distributor inner shaft structure is shown in FIG. 1, FIG. 12, which comprises the anti-rotation plate 20 fastened on the lower part of the inner shaft structure 10 by bolts, and four upright columns 30 arranged in quadrilateral and fastened to the non-rotating base frame of the filling machine or on the ground, wherein said anti-rotation plate 20 are provided with four kidney shape holes 201 (or slot) in the positions corresponding to the four upright columns 30 and matching with the four columns 30. When setting the four kidney shape holes 201 fastened to anti-rotation plate on the lower part of the inner shaft structure 10 into the corresponding upright columns, the purpose of the anti-rotation of the inner shaft structure 10 can be achieved, and the inner shaft structure 10 may be moved with small amplitude in the lateral direction on the basis of maintaining non-rotating since the anti-rotation plate 20 is set to the upright column 30 through the kidney shape hole. However, due to processing and/or assembly, there will be deviations in the axis of the inner shaft structure and the axis of the outer ring rotatably mounted on the top of the inner shaft structure. Therefore, when the outer ring of the distributor rotates along with the rotating stand of the filling machine, the outer ring cannot be rotated completely around the axis of the inner shaft structure, and the shaft structure 10 would be subjected to horizontal forces in all directions, so that the top of the inner shaft structure 10 will have small movements corresponding to the force. However, the inner shaft structure can only have small lateral movement but not movements in all direction since it is limited by the anti-rotation plate set to the upright column, so in the process of outer ring rotating, the inner shaft structure will appear small amplitude swing pivoted on its lower part, leading to aggravation of the wear of the outer ring and inner shaft structure as well as the sealing ring therebetween, thus lowering the service life of the outer ring and the inner shaft structure as well as the sealing ring therebetween, and ultimately affect the efficiency of the filling production efficiency and the filling quality. And replacement of worn parts requires a lot of manpower and time.

BRIEF SUMMARY OF THE INVENTION

Object of the present invention is to provide an anti-rotation device capable to prevent the emergence of inner shaft swing and reduce wear of the inner shaft structure of the distributor.

The anti-rotation device for the distributor inner shaft structure of the present invention comprises an upright column, a bracket fastened on the upright column, two swing arms arranged in opposite directions, and two connecting rods arranged in parallel, wherein the upright column is fixed on the ground or fixedly connected to a non-rotating base frame on a filling machine, the middle parts of the two swing arms are respectively hinged on the bracket so as to be able to swing horizontally, and the end parts of the two swing arms in opposite directions have meshing gear teeth. The two connecting rods are located between the swing arms and an inner shaft structure of the distributor, one end of each is respectively hinged to the other end of the corresponding swing arm, and the other ends of the two connecting rods are then respectively hinged to the lower part of the inner shaft structure of the distributor, and are capable of swinging horizontally relative to the swing arms and the inner shaft structure.

A distributor anti-rotation device according to the present invention, during operation, if the inner shaft structure attempts to rotate under the action of the outer ring, it will need to drive two connecting rods to move in the opposite directions, and at the same time drive the two swing arms to rotate around the hinging center of its middle part in a same clock direction (clockwise or counterclockwise) by the two connecting rods. Whereas, based on the principle that the two gears meshed with each other shall rotate in opposite directions when they rotate, the messing gear teeth at the opposite ends of the two swing arms will prevent the two swing arms rotating in a same clock direction, thereby preventing the two connecting rods moving in opposite directions, and thus the inner shaft structure of the distributor cannot rotate, and the anti-rotation purpose of the inner shaft structure of the distributor will be achieved. And when the outer ring of the distributor rotates, and applies a horizontal force on the top of the inner shaft structure due to its deviation from the axis of the inner shaft structure, and attempts to drive the inner shaft structure to move with small amplitude in the horizontal direction, maintaining the synchronous movement of the lower part of the inner shaft structure with the top of the same requires ensuring that the two connecting rods have the corresponding movement in the same direction and/or the corresponding swing in the same direction, and thus let the two connecting rods drive the two swing arms to rotate around the hinging center of their middle part in opposite clock directions. It is known that the two swing arms are capable to rotate correspondingly around the hinging center of their middle part in opposite clock directions according to the principle that the two gears meshed with each other shall rotate in opposite directions when they rotate. Therefore during operation, the swing arms and the connecting rods can have corresponding action to start the horizontal movement of small amplitude of the inner shaft structure, enable the top and lower parts of the inner shaft structure to maintain synchronous horizontal movement in all directions, to prevent the case that the inner shaft structure appears small amplitude swing pivoted on its lower part due to the same cannot move horizontally along with its top part and leads to aggravation of the wear of the outer ring and inner shaft structure as well as the sealing ring therebetween. Obviously, application of the present invention can extend the service life of the outer ring and the inner shaft structure as well as the sealing ring therebetween, and improve the efficiency of the filling production efficiency and the filling quality. Moreover, it can reduce the replacement frequency of the corresponding parts and components, saving a lot of manpower and time.

DETAILED DESCRIPTION OF THE PREFERRED EMBODIMENTS

Figure 1:
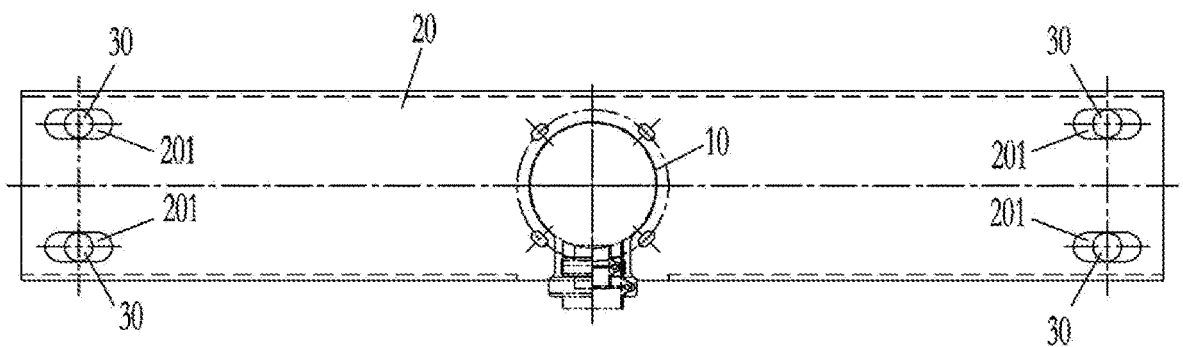
FIG. 1 is a schematic structural view of the prior art.

As shown in FIGS. 2 to 11, the said anti-rotation device for the distributor inner shaft structure comprises an upright column (1), a bracket (2) fastened on the upright column (1), two swing arms (3) arranged in opposite directions, and two connecting rods (4) arranged in parallel, wherein the upright column (1) is fixed on the ground or fixedly connected to a non-rotating base frame (300) on a filling machine, the middle parts of the two swing arms (3) are respectively hinged on the bracket (2) so as to be able to swing horizontally, and the end parts of the two swing arms (3) in opposite directions have meshing gear teeth (31). The two connecting rods (4) are located between the swing arms (3) and an inner shaft structure (100) of the distributor, one end of each is respectively hinged to the other end of the corresponding swing arm (3), and the other ends of the two connecting rods (4) are then respectively hinged to the lower part of the inner shaft structure (100) of the distributor, and are capable of swinging horizontally relative to the swing arms (3) and the inner shaft structure (100). The above hinging may be done by adopting a hinge shaft. During operation, if the inner shaft structure 100 attempts to rotate under the action of the outer ring 200, it will need to drive two connecting rods 4 to move in the opposite directions, and at the same time drive the two swing arms 3 to rotate around the hinging center of its middle part in a same clock direction (clockwise or counterclockwise) by the two connecting rods. Whereas, based on the principle that the two gears meshed with each other shall rotate in opposite directions when they rotate, the messing gear teeth 31 at the opposite ends of the two swing arms 3 will prevent the two swing arms 3 rotating in a same clock direction, thereby preventing the two connecting rods 4 moving in opposite directions, and thus the inner shaft structure 100 of the distributor cannot rotate, and the anti-rotation purpose of the inner shaft structure 100 of the distributor will be achieved (shown as FIG. 10 and FIG. 11). And when the outer ring 200 of the distributor rotates, and applies a horizontal force on the top of the inner shaft structure 100 due to its deviation from the axis of the inner shaft structure 100, and attempts to drive the inner shaft structure 100 to move with small amplitude in the horizontal direction, maintaining the synchronous movement of the lower part of the inner shaft structure with the top of the same requires ensuring that the two connecting rods 4 have the corresponding movement in the same direction and/or the corresponding swing in the same direction, and thus let the two connecting rods 4 drive the two swing arms 3 to rotate around the hinging center of their middle part in opposite clock directions. It is known that the two swing arms 3 are capable to rotate correspondingly around the hinging center of their middle part in opposite clock directions according to the principle that the two gears meshed with each other shall rotate in opposite directions when they rotate. Therefore during operation, the swing arms 3 and the connecting rods 4 can have corresponding action to start the horizontal movement of small amplitude of the inner shaft structure 100 (shown as FIGS. 7 to 10), enable the top and lower parts of the inner shaft structure 100 to maintain synchronous horizontal movement in all directions, to prevent the case that the inner shaft structure 100 appears small amplitude swing pivoted on its lower part due to the same cannot move horizontally along with its top part and leads to aggravation of the wear of the outer ring 200 and inner shaft structure 100 as well as the sealing ring therebetween. Obviously, application of the present invention can extend the service life of the outer ring 200 and the inner shaft structure 100 as well as the sealing ring therebetween, and improve the efficiency of the filling production efficiency and the filling quality. Moreover, it can reduce the replacement frequency of the corresponding parts and components, saving a lot of manpower and time.

Figure 2:
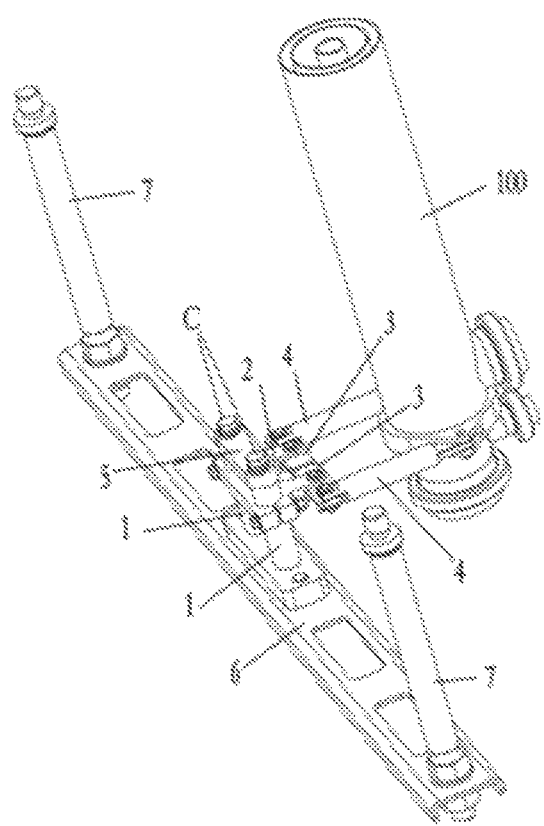
FIG. 2 is a plan view of FIG. 1.
Figure 4:
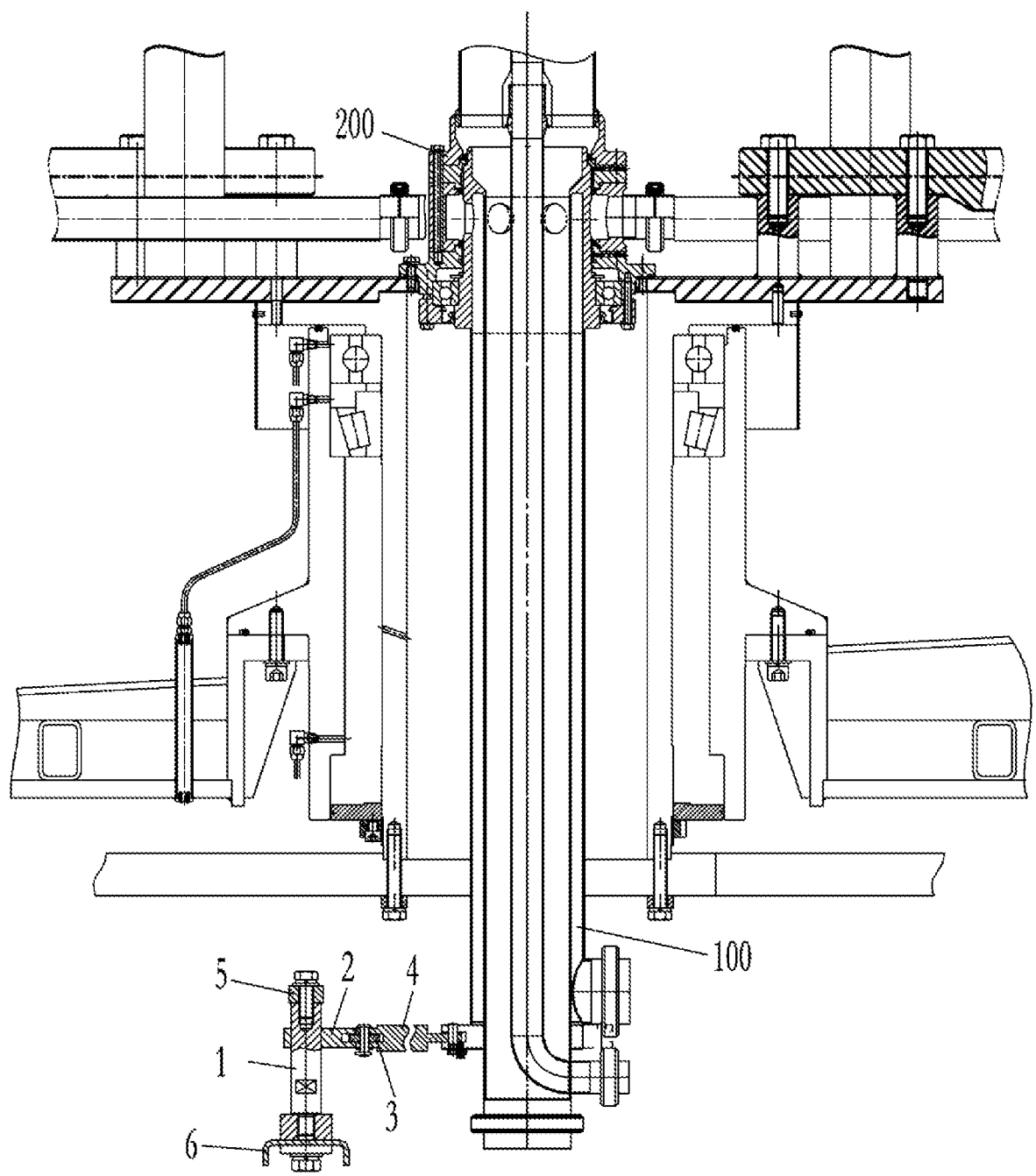
FIG. 4 is a plan view of the present invention connected to the inner shaft structure.
Figure 5:
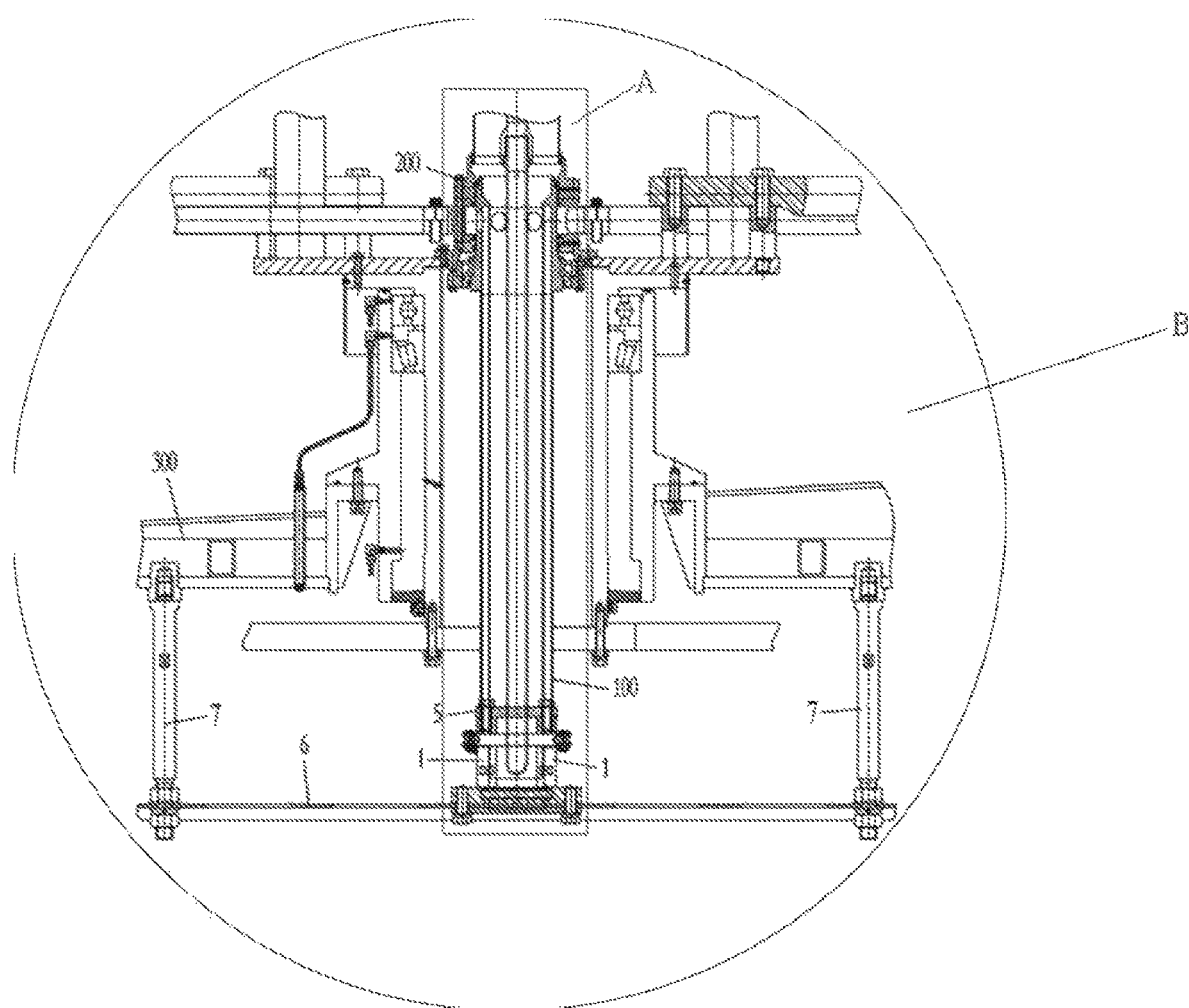
FIG. 5 is a sectional view of the present invention mounted on a filling machine.

As shown in FIG. 2, FIG. 4, FIG. 5, the quantity of upright column 1 is two; the bracket 2 is fastened detachably to upright column 1, convenient for adjusting the height of the bracket 2; at the top of the upright column 1 is fastened a pressure plate (5) for limiting the maximum height adjustable of the bracket 2.

Figure 3:
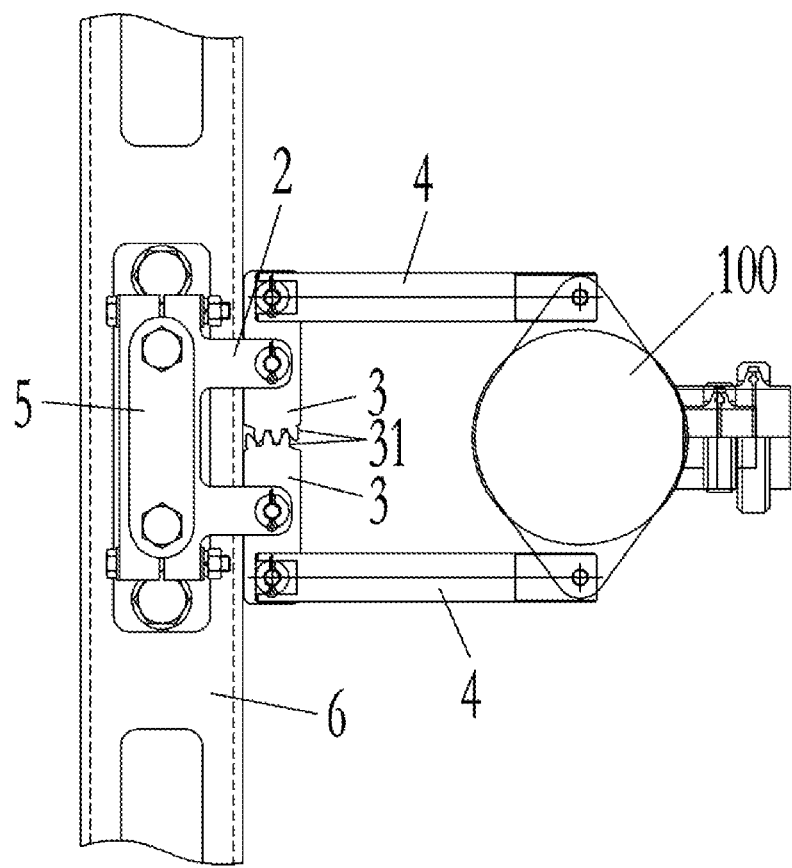
FIG. 3 is a perspective schematic view of the present invention connected to the inner shaft structure.
Figure 6:
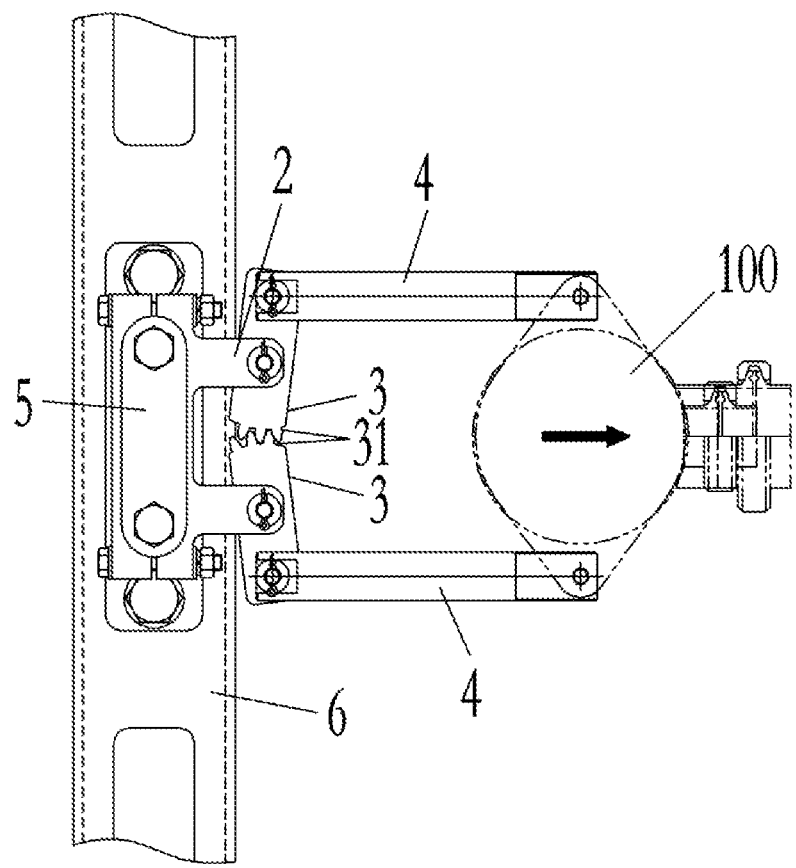
FIG. 6 is a left side view of FIG. 5.
Figure 7:
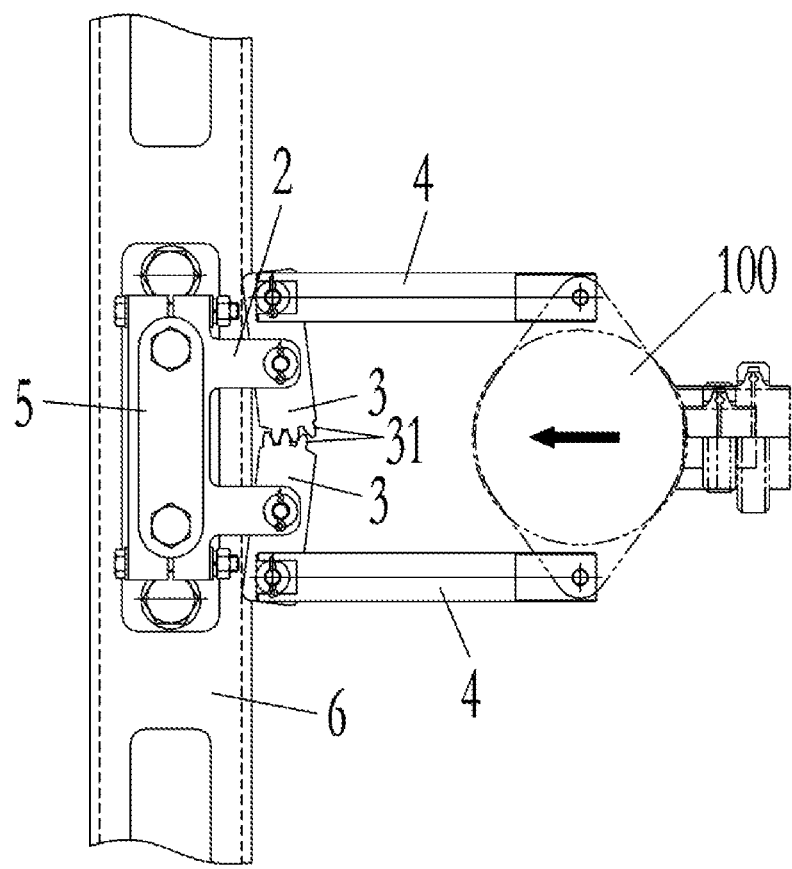
FIGS. 7 to 12 are schematic diagrams of the present invention.
Figure 8:
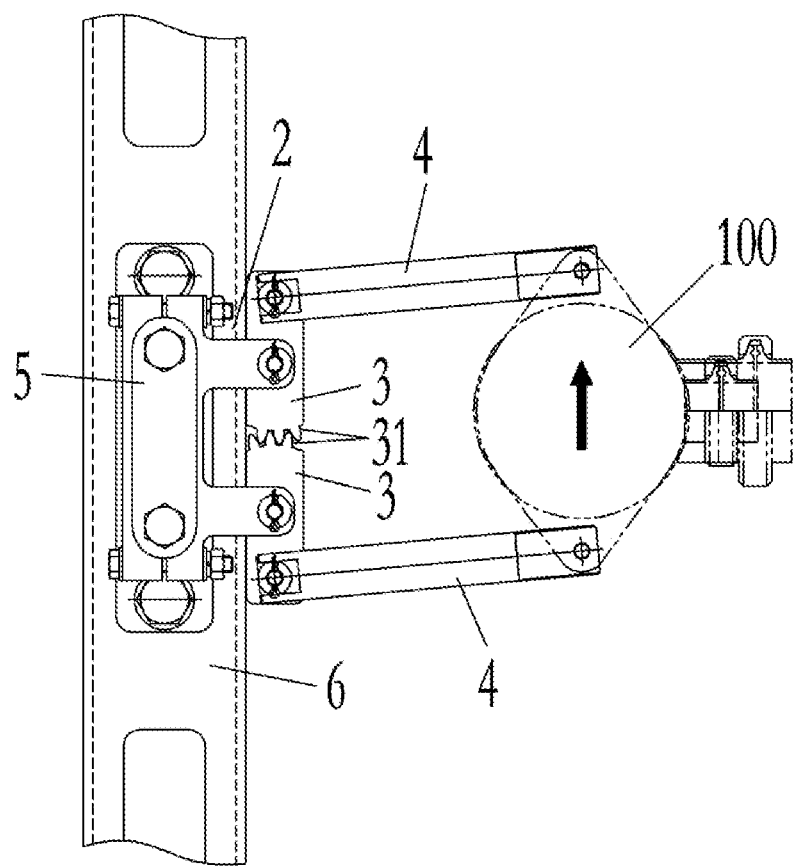
Figure 9:
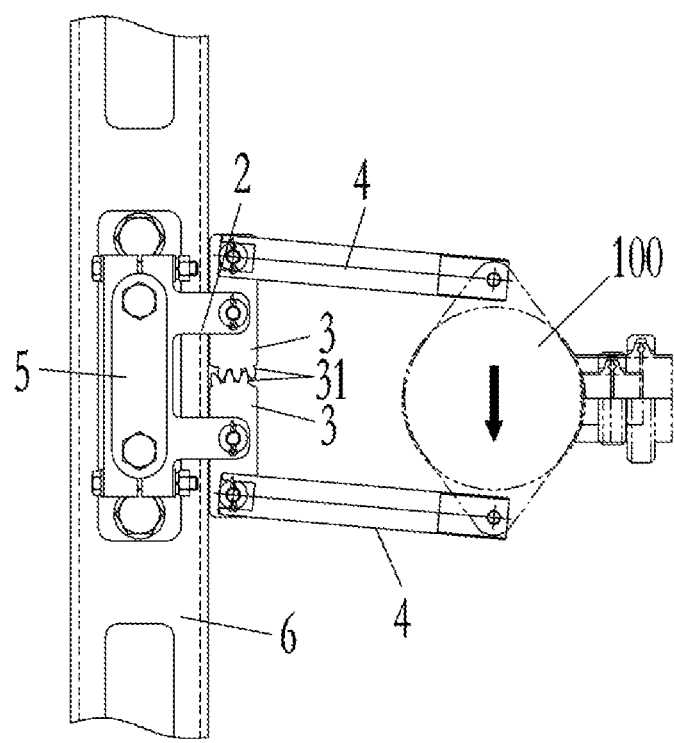
Figure 10:
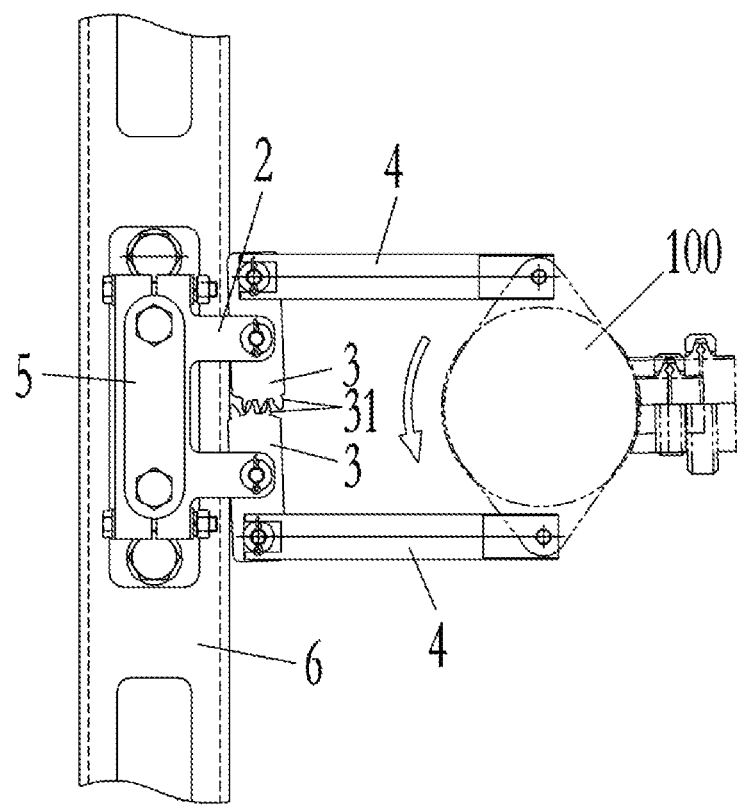
Figure 11:
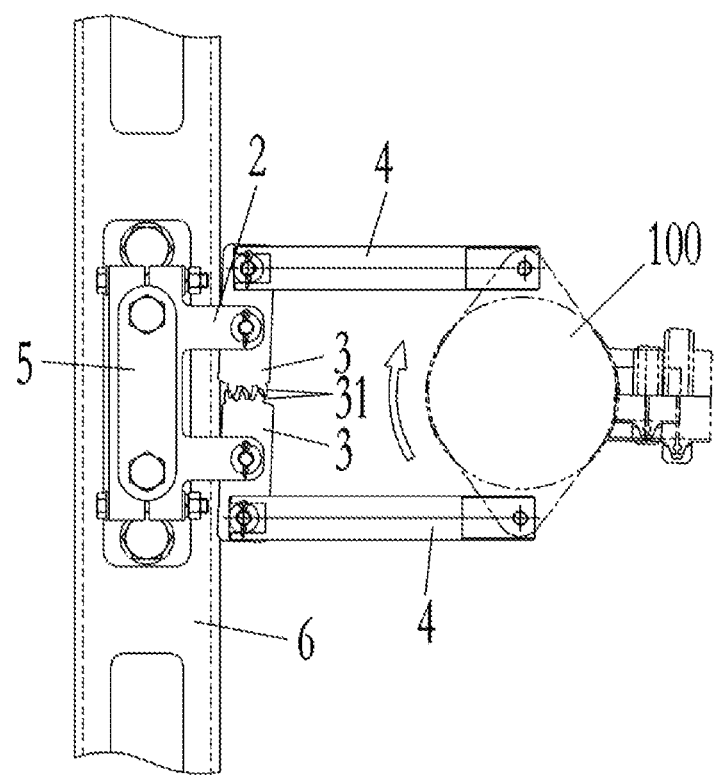
Figure 12:
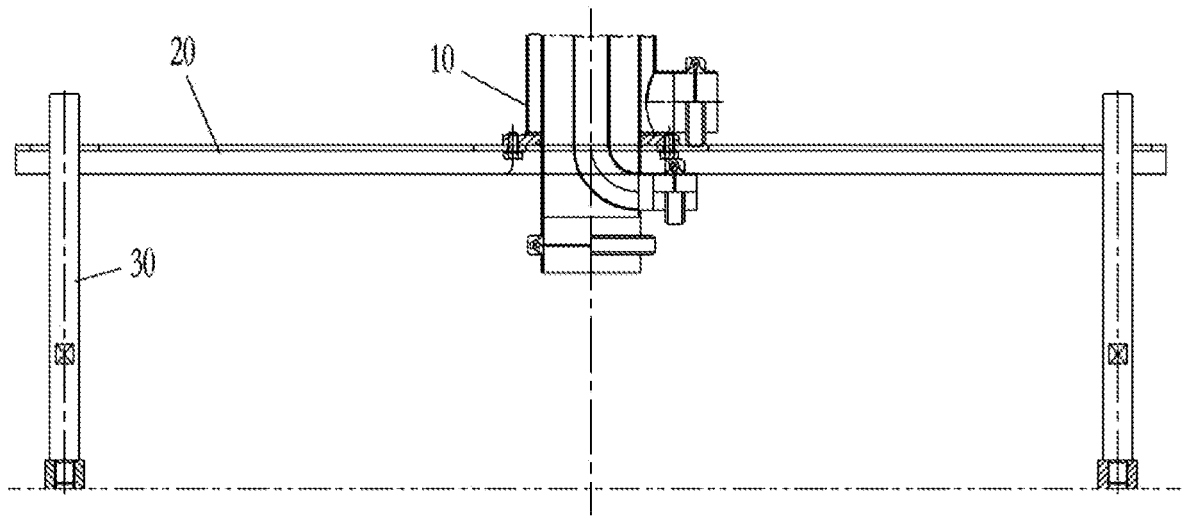

As shown in FIG. 3, FIG. 5, FIG. 6, one of the said upright columns is fastened on the anti-rotation plate 6, and the anti-rotation plate 6 is fastened to the non-rotating base frame 300 of the filling machine by at least two pillars 7, thus fixedly connecting the upright column on the non-rotating base frame 300 of the filling machine.

The invention claimed is:
1. A device for an inner shaft structure of a distributor, comprising:
    at least one upright column;
    a bracket fastened on the upright column;
    two swing arms arranged in opposite directions and having middle and end parts; and
    two connecting rods arranged in parallel;
    wherein the upright column is fixed on the ground or fixedly connected to a non-rotating base frame on a filling machine, the middle parts of the two swing arms being respectively hinged on the bracket so as to be able to swing horizontally, and the end parts of the two swing arms in opposite directions having meshing gear teeth;
    wherein the two connecting rods are located between the swing arms and an inner shaft structure having an upper part and lower part of a distributor;

wherein one end of each connecting rod is respectively hinged to the other end of the corresponding swing arm; and wherein the other ends of the two connecting rods are respectively hinged to the lower part of the inner shaft structure of the distributor, and are capable of swinging horizontally relative to the swing arms and the inner shaft structure.

2. The device for the inner shaft structure according to claim 1, wherein the quantity of upright column is two, and wherein the bracket is detachably fastened to the upright columns by bolts.

3. The device for the inner shaft structure according to claim 1, wherein a pressure plate is fastened to a top of the upright column.

4. The device for the inner shaft structure according to claim 1, wherein the upright column is fastened on an anti-rotation plate, and the anti-rotation plate is fastened to the non-rotating base frame of the filling machine via at least two pillars; whereby the upright column is fixedly connected to the non-rotating base frame.

\* \* \* \* \*